United States Patent
Sterzbach (10) Patent No.: US 10,673,543 B2
(45) Date of Patent: Jun. 2, 2020

(54) METHOD AND APPARATUS FOR PROVIDING A NETWORK PROFILE

(71) Applicant: Rohde & Schwarz GmbH & Co. KG, München (DE)

(72) Inventor: Bernhard Sterzbach, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/176,979

(22) Filed: Oct. 31, 2018

(65) Prior Publication Data

US 2019/0245632 A1   Aug. 8, 2019

Related U.S. Application Data

(60) Provisional application No. 62/626,246, filed on Feb. 5, 2018.

(51) Int. Cl.
| | |
|---|---|
| *H04B 17/00* | (2015.01) |
| *H04B 17/16* | (2015.01) |
| *H04L 1/20* | (2006.01) |
| *H04W 24/06* | (2009.01) |
| *H04B 17/17* | (2015.01) |
| *H04W 16/22* | (2009.01) |

(52) U.S. Cl.
CPC ......... *H04B 17/0085* (2013.01); *H04B 17/16* (2015.01); *H04B 17/17* (2015.01); *H04L 1/206* (2013.01); *H04W 24/06* (2013.01); *H04W 16/22* (2013.01)

(58) Field of Classification Search
CPC ..... H04W 24/00; H04W 24/06; H04W 24/08; H04W 24/10

USPC ......................................... 455/423, 424, 425
See application file for complete search history.

(56) References Cited

U.S. PATENT DOCUMENTS

| | | | | |
|---|---|---|---|---|
| 2009/0156198 A1* | 6/2009 | Lee | ........................ | H04W 24/08 455/425 |
| 2013/0258875 A1* | 10/2013 | Siomina | ................. | H04W 36/30 370/252 |
| 2015/0189525 A1* | 7/2015 | Schmidt | ................ | H04W 24/08 455/436 |

(Continued)

FOREIGN PATENT DOCUMENTS

WO      2008045866 A2    4/2008

OTHER PUBLICATIONS

"LTE in Wireless: All about SIB's in LTE", http://lteinwireless.blogspot.de/2011/06/all-about-sibs-in-lte.html, downloaded Jan. 10, 2018, 4 pages.

(Continued)

*Primary Examiner* — Kevin Kim
(74) *Attorney, Agent, or Firm* — Westman, Champlin & Koehler, P.A.

(57) ABSTRACT

A method and apparatus for providing a network profile used for testing of a device under test, the method comprising the steps of reading at least one field test log file recorded during a field test of said device under test, wherein the field test log file comprises network protocol messages and/or physical layer measurement data and extracting one or more protocol messages and/or payload data from the recorded field test log file including information concerning associated cells of a cellular network to generate automatically the network profile.

14 Claims, 7 Drawing Sheets

(56) References Cited

U.S. PATENT DOCUMENTS

2015/0208197 A1* 7/2015 Keskitalo ............. H04W 24/10
455/456.1
2018/0292844 A1* 10/2018 Kosseifi ................. B60L 53/51

OTHER PUBLICATIONS

QUALCOMM®, "QXDM Professional™ Quick Start", 80-N9471-1 B, © 2016 Qualcomm Technologies, Inc. All rights reserved, 2 pages.

* cited by examiner

| | Field Log | Cell List | Profile Builder | Campaign | | |
|---|---|---|---|---|---|---|
| | Time | RAT | Band / EARFCN | Phy ID | Type | Content |
| 172031 | 08:27:10.004 | LTE | FDD 3 / 5100 | 251 | Measurement | RSRP=27 RSSI=35 RSRQ=15 |
| 172032 | 08:27:10.008 | LTE | FDD 3 / 5100 | 251 | RRC Broadcast | SIB1 (USA/T-Mobile) |
| 172039 | 08:27:11.004 | LTE | FDD 3 / 5100 | 251 | Measurement | RSRP=28 RSSI=32 RSRQ=15 |
| 172033 | 08:27:10.012 | LTE | FDD 3 / 5100 | 251 | RRC Broadcast | SIB2 SIB3 |
| 172039 | 08:27:11.004 | LTE | FDD 3 / 5100 | 251 | Measurement | RSRP=28 RSSI=32 RSRQ=15 |
| 172034 | 08:27:10.017 | LTE | FDD 3 / 5100 | 251 | RRC Broadcast | SIB4 |
| 172035 | 08:27:10.038 | LTE | FDD 3 / 5100 | 251 | RRC Broadcast | SIB5 |
| 172036 | 08:27:10.042 | LTE | FDD 3 / 5100 | 251 | RRC Paging | |
| 172040 | 08:27:10.338 | LTE | FDD 3 / 5100 | 251 | NAS UL | NAS Attach Request |
| 172041 | 08:27:10.356 | LTE | FDD 3 / 5100 | 251 | NAS UL | PDN Connectivity Request |
| 172037 | 08:27:10.378 | LTE | FDD 3 / 5100 | 251 | RRC UL | RRC Connection Request |
| 172038 | 08:27:10.538 | LTE | FDD 3 / 5100 | 251 | RRC DL | RRC Connection Setup |
| 172042 | 08:27:10.938 | LTE | FDD 3 / 5100 | 251 | RRC UL | RRC Connection Setup Complete (NAS Att., PDN Conn.) |
| 172039 | 08:27:11.004 | LTE | FDD 3 / 5100 | 251 | Measurement | RSRP=28 RSSI=32 RSRQ=15 |
| 172043 | 08:27:11.038 | LTE | FDD 3 / 5100 | 251 | RRC DL | RRC DL Information (NAS Auth. Req.) |
| 172044 | 08:27:11.473 | LTE | FDD 3 / 5100 | 251 | RRC UL | RRC DL Information (NAS Auth. Resp.) |
| 172045 | 08:27:11.538 | LTE | FDD 3 / 5100 | 251 | RRC DL | RRC DL Information (NAS Sec. Mode Cmd.) |
| 172039 | 08:27:11.704 | LTE | FDD 3 / 5100 | 251 | Measurement | RSRP=28 RSSI=33 RSRQ=15 |
| 172039 | 08:27:11.942 | LTE | FDD 3 / 5100 | 251 | Measurement | RSRP=29 RSSI=32 RSRQ=14 |

Drive0287.isf - Block 172033 (627939) - 2017-07-13 08:27:10.012 - RRC Broadcast SIB2 SIB3

Fig. 5

| | MCC | MNC | RAT | Band / EARFCN | Phy ID | Use | SIBs | Procedures |
|---|---|---|---|---|---|---|---|---|
| 1 | USA | T-Mobile | LTE | FDD 3 / 5100 | 251 | Serving Cell | 1 2 3 4 5 | Reg HO(src) CA(p) |
| 2 | USA | T-Mobile | LTE | FDD 3 / 5300 | 254 | Blind HO dest. | 1 2 3 4 5 | HO(dst) HO(src) |
| 3 | USA | T-Mobile | LTE | FDD 5 / 6400 | 60 | CA Scell (DL) | | CA(s) |
| 4 | USA | T-Mobile | LTE | FDD 7 / 8230 | 66 | Serving Cell | 1 2 3 4 5 6 | CA(s) |
| 5 | USA | T-Mobile | LTE | FDD 5 / 6400 | 61 | Serving Cell | 1 2 3 4 5 6 | |
| 6 | USA | T-Mobile | LTE | FDD 5 / 6400 | 62 | Serving Cell | 1 2 3 4 5 6 | |
| 7 | USA | T-Mobile | LTE | FDD 5 / 6400 | 63 | Serving Cell | 1 2 3 4 5 6 | |
| 8 | USA | T-Mobile | LTE | FDD 5 / 6400 | 64 | Serving Cell | 1 2 3 4 5 6 | |
| 9 | USA | T-Mobile | LTE | FDD 5 / 6400 | 65 | Serving Cell | 1 2 3 4 5 6 | |
| 10 | USA | T-Mobile | LTE | FDD 5 / 6400 | 66 | Serving Cell | 1 2 3 4 5 6 | |
| 11 | USA | T-Mobile | LTE | FDD 5 / 6400 | 66 | Serving Cell | 1 2 3 4 5 6 | |
| 12 | USA | T-Mobile | LTE | FDD 5 / 6400 | 66 | Serving Cell | 1 2 3 4 5 6 | |
| 13 | USA | T-Mobile | LTE | FDD 5 / 6400 | 66 | Serving Cell | 1 2 3 4 5 6 | |
| 14 | USA | T-Mobile | LTE | FDD 5 / 6400 | 66 | Serving Cell | 1 2 3 4 5 6 | |
| 15 | USA | T-Mobile | LTE | FDD 5 / 6400 | 66 | Serving Cell | 1 2 3 4 5 6 | |

Fig. 6

| Field Cells | Scope | Card | Parameters and Message Modifications | Applied to |
|---|---|---|---|---|
| US/T-Mob.LTE x<br>03 / 5300 - 251 | Name "LTE Cell 1" | Cell Setup<br>Cell Act.<br>Registration | MCC, MNC, Freq, Phys. ID<br>SIB1 SIB2 SIB3 SIB4 SIB5<br>RRCConnectionSetup | LTE00 LTE01<br>LTE27 LTE28<br>LTE29 LTE47a |
| US/T-Mob.LTE x<br>03 / 5300 - 254 | Name "LTE Cell 2" | Cell Setup<br>Cell Act.<br>Registration | MCC, MNC, Freq, Phys. ID<br>SIB1 SIB2 SIB3 SIB4 SIB5<br>RRCConnectionSetup | LTE27 LTE28<br>LTE29 |
| | | | | |

Fig. 7

METHOD AND APPARATUS FOR PROVIDING A NETWORK PROFILE

CROSS-REFERENCE TO RELATED APPLICATION(S)

The present application claims priority to U.S. Provisional Application No. 62/626,246, filed on Feb. 5, 2018, the content of which is hereby incorporated by reference in its entirety.

The invention relates to a method and apparatus for providing a network profile used for testing of a device under test, in particular a mobile radio device.

TECHNICAL BACKGROUND

Mobile radio devices or user equipment UE are extensively tested in the field, i.e. in public radio networks. The public radio networks can comprise cellular networks comprising a plurality of cells. However, such in-field tests are time-consuming and thus expensive. During the in-field test, the device under test communicates with base stations of the cellular network. The device under test receives downlink messages transmitted by base stations of the public radio network and can transmit itself uplink messages back to the base stations. Accordingly, during the in-field test, protocol messages are exchanged between the mobile radio device under test and other entities of the network system. The device under test can write during the in-field test one or more field test log files. For instance, it is possible to generate in-field log files by a log recorder connected to the device under test during the in-field test. These recorded field test log files are in a conventional system analyzed manually to extract causes of an observed behavior of the device under test during the field test. The test authorizing software can then be used to create a similar test which may be run on a network simulator. This test is then refined until a similar behavior is observed in the test laboratory.

SUMMARY OF THE INVENTION

The invention provides according to a first aspect a method for providing a network profile used for testing of a device under test, the method comprising the steps of:

reading at least one field test log file recorded during a field test of the device under test, wherein the field test log file comprises network protocol messages and/or physical layer measurement data and extracting one or more protocol messages and/or payload data from the recorded field test log file including information concerning associated cells of a cellular network to generate automatically the network profile.

In a possible embodiment of the method according to the first aspect of the present invention, the generated network profile is applied to a testing device which replicates a network configuration of the cellular network in the field.

In a further possible embodiment of the method according to the first aspect of the present invention, if a number of cells included in the field test log file of the device under test exceeds a number of cells supported by the testing device, the network configuration is automatically restricted to relevant cells.

In a further possible embodiment of the method according to the first aspect of the present invention, the relevant cells comprise cells where an irregular behavior concerning the device under test has been observed during the field test.

In a further possible embodiment of the method according to the first aspect of the present invention, the field test log file recorded during a field test of the device under test comprises a file format specific to a type of the device under test.

In a further possible embodiment of the method according to the first aspect of the present invention, the protocol messages extracted from the recorded field test log file comprise downlink protocol messages transmitted by a base station to the device under test located in a cell of the cellular network during the field test.

In a further possible embodiment of the method according to the first aspect of the present invention, the protocol messages extracted from the recorded field test log file comprise uplink protocol messages transmitted by the device under test located in a cell of the cellular network to a base station of said cell during the field test.

In a further possible embodiment of the method according to the first aspect of the present invention, the protocol messages extracted from the recorded field test log file comprise broadcast messages.

In a further possible embodiment of the method according to the first aspect of the present invention, the protocol messages extracted from the recorded field test log file comprise system information block broadcast messages.

In a still further possible embodiment of the method according to the first aspect of the present invention, the information concerning a cell associated with extracted protocol messages comprise operator data, country codes, cell identifiers of cells, cell configuration data, system information block data, neighbor cell information data, cell frequencies and/or cell frequency bands.

In a still further possible embodiment of the method according to the first aspect of the present invention, the physical layer measurement data of the recorded field test log file comprise radio signal parameters including signal strength, signal quality and/or signal fading.

In a further possible embodiment of the method according to the first aspect of the present invention, the generated network profile is applied to protocol test scripts executed by a testing device using a replicated network configuration observed during the field test.

In a still further possible embodiment of the method according to the first aspect of the present invention, a message flow of protocol messages extracted from the recorded field test log file is analyzed to identify protocol procedures executed during the field test using graph-based algorithms or machine learning.

In a still further possible embodiment of the method according to the first aspect of the present invention, the network protocol messages and/or physical layer measurement data forming relevant information elements of field test log files are presented to a user by means of a user interface of a processing unit and/or are applied to a filter to select and/or filter the relevant information elements.

In a further possible embodiment of the method according to the first aspect of the present invention, the selected and/or filtered relevant information elements are grouped automatically according to the type of the network and/or the associated cells of the network.

The invention further provides according to a further aspect a field to lab software tool adapted to generate a network profile used for testing a device under test, wherein the field to lab software tool is adapted to perform the steps of:

reading at least one field test log file recorded during a field test of the device under test, wherein the field test log file comprises network protocol messages and/or physical layer measurement data and extracting one or more protocol messages and/or payload data from the recorded field test log file including information concerning associated cells of a cellular network to generate automatically a network profile.

The invention further provides according to a further aspect a system for mobile radio testing of a device under test comprising a processing unit adapted to read at least one field test log file recorded during a field test of the device under test from a memory, wherein the field test log file comprises network protocol messages and/or physical layer measurement data, wherein the processing unit is further adapted to extract one or more protocol messages and/or payload data from the recorded field test log file including information concerning associated cells of a cellular network to generate automatically the network profile.

In a possible embodiment of the system according to the third aspect of the present invention, the generated network profile is applied to a testing device of the system which is configured to replicate a network configuration of the cellular network in the field based on the applied network profile.

BRIEF DESCRIPTION OF FIGURES

In the following, possible embodiments of the different aspects of the present invention are described in more detail with reference to the enclosed figures.

FIGS. 4, 5, 6, 7 illustrate a possible exemplary implementation of a field to lab software tool according to a further aspect of the present invention.

DETAILED DESCRIPTION OF EMBODIMENTS

Figure 1:
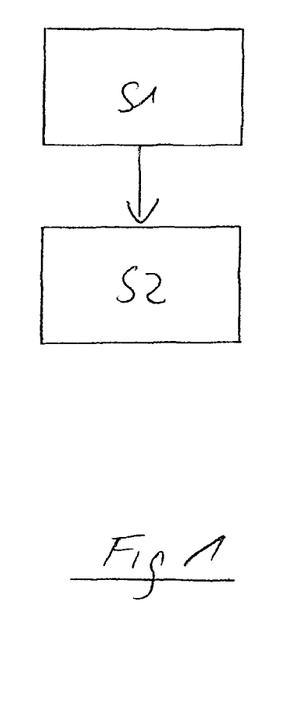
FIG. 1 shows a flowchart of a possible exemplary embodiment of a method for providing a network profile according to the first aspect of the present invention.
Figure 3:
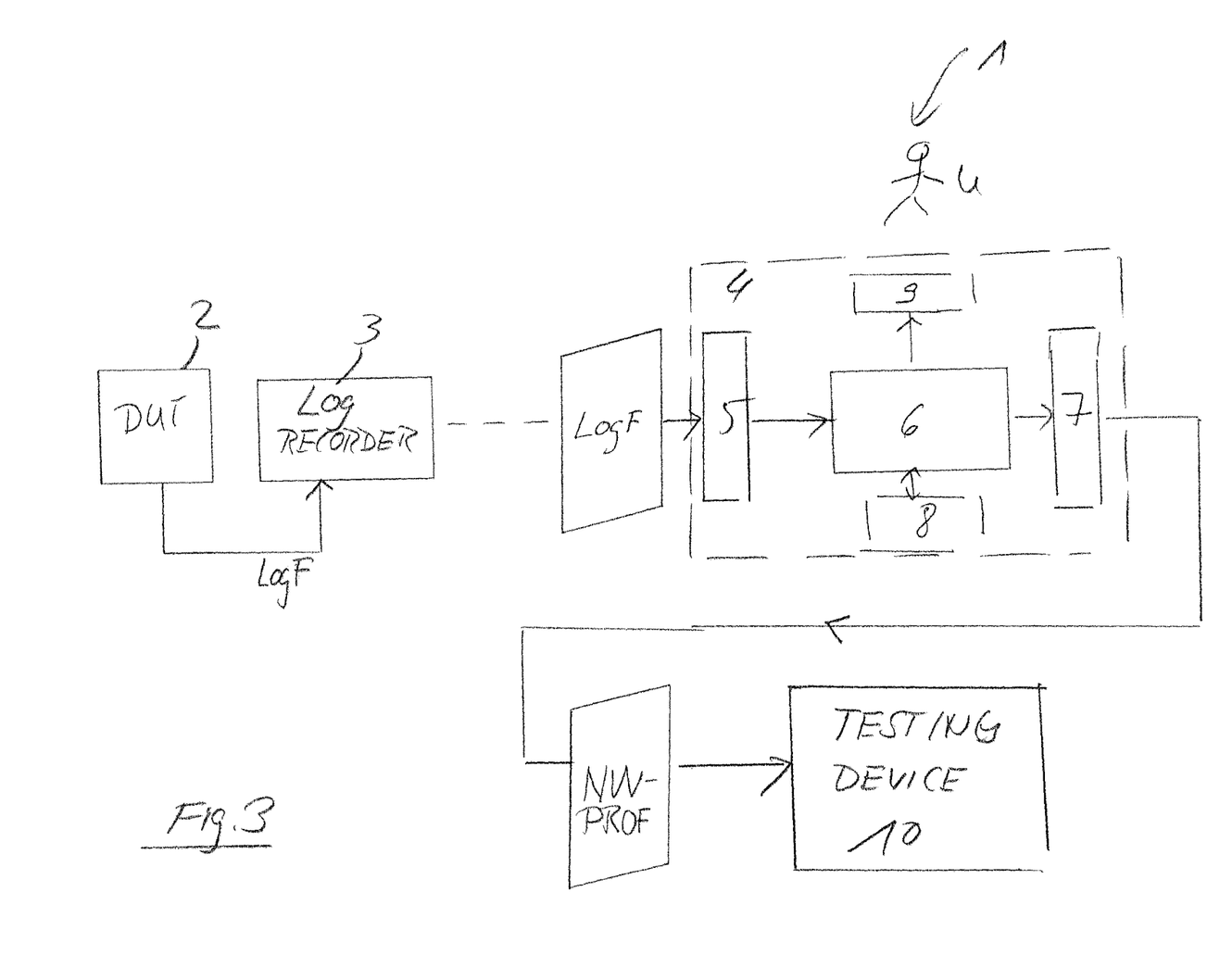
FIG. 3 shows a schematic block diagram for illustrating a possible exemplary embodiment of a system for a mobile radio testing of a device under test according to a further aspect of the present invention.

FIG. 1 shows a flowchart of a possible exemplary of a method for providing a network profile according to a first aspect of the present invention. The method for providing a network profile illustrated in FIG. 1 can be used for testing of a device under test 2 or a user equipment, in particular a mobile radio device in a system 1 as shown in FIG. 3.

As illustrated in the flowchart of FIG. 1, the method comprises in the illustrated embodiment two main steps.

In a first step S1, at least one field test log file LogF recorded during a field test of the device under test 2 is read from a memory. The field test log file LogF comprises network protocol messages and/or physical layer measurement data. In a possible embodiment, the field test log file LogF is recorded by a log recorder device 3 connected to the device under test 2 during the field test via a data interface. The log recorder 3 can comprise a memory to store one or more field test log files LogF provided by the device under test 2 during the field test. In an alternative embodiment, the device under test 2 comprises an internal memory or register to store temporarily one or more field test log files recorded during the field test which may be supported by the operating system of the device under test 2. The recorded field test log file LogF recorded during the field test of the device under test 2 can comprise a file format specific to a type of the respective device under test 2.

In a further step S2, one or more protocol messages and/or payload data are extracted from the recorded field test log file LogF including information concerning associated cells of the cellular network to generate automatically the network profile.

The recorded field test log file LogF can comprise network protocol messages and/or physical layer measurement values or physical layer measurement data. In step S2, protocol messages and/or payload data are extracted from the recorded field test log file LogF of the device under test 2. The protocol messages extracted from the recorded field test log file LogF can comprise downlink protocol messages transmitted by a base station of a communication network to the device under test 2 during the field test. During the field test, the device under test 2 can be located stationary in a cell of the communication network or cellular network or may move within a cell of the network or may even move from one cell of the network to another cell of the network. Accordingly, normally, the device under test 2 performs a bidirectional communication with one or more entities of the cellular communication network. The protocol messages extracted from the recorded field test log file LogF of the device under test 2 can further comprise uplink protocol messages which are transmitted by the device under test 2 located in a cell of the cellular network to a base station of the respective cell during the field test. The base station can comprise for instance an eNode B of an LTE system. The protocol messages extracted from the recorded field test log file LogF of the device under test 2 can further comprise broadcast messages. These broadcast messages can include for instance system information block, SIB, broadcast messages.

The information concerning a cell associated with one or more extracted protocol messages can comprise a set of data including operator data concerning the network operator, country codes, a cell identifier of the cell, a cell configuration, system information block data, information data concerning neighboring cells of the respective cell, a cell frequency used by the base station of the respective cell as well as a cell frequency band where communication takes place.

Further, the physical layer measurement data of the recorded field test log file LogF can comprise in a possible embodiment radio signal parameters including signal strength, signal quality and/or signal fading information. In a possible embodiment, a message flow of the protocol messages extracted from the recorded field test log file LogF can be analyzed to identify protocol procedures executed during the field test using in a possible embodiment a graph-based algorithm and/or a machine learning process. In a possible embodiment, the network protocol messages and/or physical layer measurement data forming relevant information elements of the field test log file LogF can be represented to a user or operator by means of a user interface of a processing unit or computer system and/or applied to a filter unit to select and/or filter the relevant information elements. The selected and/or filtered relevant information elements can be grouped automatically according to a type of the network and/or the associated cells of the network.

Figure 2:
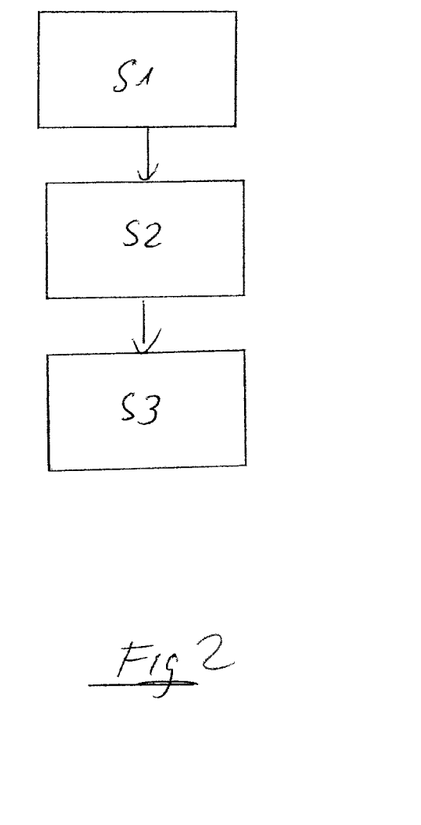
FIG. 2 shows a further flowchart of a possible exemplary embodiment of a method for providing a network profile used for testing of a device under test according to an aspect of the present invention.

A further possible embodiment of the method according to the first aspect of the present invention is illustrated in the flowchart of FIG. 2. In the process illustrated in FIG. 2, the network profile generated in step S2 is applied to a testing device 10 which replicates in step S3 a network configuration of the communication network in the field. The testing device 10 can comprise a network simulator. The network simulator can use the generated network profile to mimic a network configuration of the network in the field. The network simulator of the system 1 can create in a possible embodiment a data structure which prescribes changes with specific protocol procedures (also called "card") and their parameters, together with changes to outgoing messages. In a possible embodiment, the generated network profile can be applied to protocol test scripts executed by the testing device 10 using the replicated network configuration observed during the field test.

In a further possible embodiment of the method of the present invention, if a number of cells included in the field test log file LogF of the device under test exceeds a number of cells supported by the testing device 10, the network configuration can be automatically restricted to relevant cells of the communication network. The relevant cells can comprise cells where an irregular behavior concerning the device under test 2 has been observed during the field test. The irregular behavior can comprise a failure of the device under test 2 during the field test or any other kind of observed irregular behavior. If the number of cells found in the field test log file LogF exceeds the capabilities of the testing device 10, i.e. the network simulator, the network configuration can be automatically restricted to the most important relevant cells, e.g. those cells which were used or active when an error occurred. Consequently, any manual efforts necessary in conventional systems are significantly reduced by the method according to the present invention. The test log files LogF used during the field test can be read and analyzed. In a possible embodiment, the extracted information comprising the protocol messages and/or payload data can be presented to a user who may select the most relevant parts. The field test log files are usually produced in file formats specific to the type of the respective device under test 2. The field test log files LogF can be integrated by the system to extract relevant information. Relevant information includes measurement data such as signal strength or signal quality as well as protocol messages, in particular uplink protocol messages and/or downlink protocol messages. The relevant information elements within the field test log file are presented in a possible embodiment to a user by means of display units of a graphical user interface in sequential order. In a possible embodiment, the user can restrict the relevant information elements of the field test log file for further analysis, e.g. to focus on a specific time span for which an irregular behavior of the device under test 2 and/or other entities of the communication network in relation to the device under test 2 has been observed.

Information can then be grouped by the type of network and the cell of the network. For each cell, all available information can be collected, e.g. signal measurements, received cell configuration, messages exchanged with a base station of the cell or information about the cell given by other cells. In a possible embodiment, a list of these cells can be presented to the user. For each cell, the cell list can contain a variety of information data such as a country code, operator information or frequency information. From the cell list, it is possible to select most relevant cells. For the selected cells, the available information can be analyzed to extract a specific time span of some seconds for use by the testing device 10, e.g. network simulator. This includes network and cell configuration or radio signal parameters such as signal strength, signal quality or signal fading as well as variations over time of the signal parameters and associated network behavior.

The cell configuration settings can include a content of cell broadcast messages. The content of such broadcast messages is either set to an exact copy of the content of the equivalent message in the recorded field test log file or can be adjusted according to capabilities or limits of the testing device. The testing device of the system according to the present invention can be formed in a possible embodiment by a network simulator. A network simulator can create data structures prescribing changes to specific protocol procedures and to their parameters. Network protocols can be applied to preexisting protocol test scripts in order to let them execute using a network configuration observed during the field test. The system 1 according to the present invention can be extended to identify protocol procedures that were executed during the field test by analyzing and/or interpreting the observed message flow, e.g. by using graph-based algorithms or machine learning. It can then output a test script which elicits the same procedures on the network simulator.

FIG. 3 illustrates a schematic diagram of a possible exemplary embodiment of a system according to a further aspect of the present invention. The system 1 as illustrated in FIG. 3 can be used for mobile radio testing of at least one device under test 2 which can be tested in an in-field test. In the illustrated exemplary embodiment, the device under test 2 is connected during the field test to a log recorder 3 storing the at least one field test log file LogF recorded during the field test of the device under test 2. The log recorder 3 can comprise a storage or data memory to store at least one field test log file LogF of the device under test 2. In an alternative embodiment, the device under test 2 can comprise an integrated memory for storing one or more field test log files LogF written during a field test of the device under test 2. As shown in FIG. 3, the system 1 comprises a processing unit 4 having a data input interface 5 and at least one processor 6 as well as an output interface 7. The processing unit 4 can be implemented on a computer system 4. The computer system 4 can comprise in the illustrated embodiment an internal storage 8 for storing input log files of one or more devices under test 2 for further processing. The computer system 4 further comprises in the illustrated embodiment a user interface 9 having a display adapted to display relevant information to a user U monitoring the testing procedure. The computer system 4 is adapted to read at least one field test log file LogF recorded during a field test of the device under test 2 from a memory, e.g. from a memory of the log recorder 3 or from its local memory 8. The computer system 4 is further adapted to extract one or more protocol messages and/or payload data from the recorded field test log file LogF including information concerning associated cells of a cellular or a communication network used during the field test to generate automatically a network profile of the respective network. In the system 1 of FIG. 3, the generated network profile is output by the computer system 4 via its output interface 7 and applied to a testing device 10 of the system 1. The testing device 10 of the system 1 is in a preferred embodiment a network simulator such as a CMW500 mobile radio tester. The network profile output by the computer system 4 can be applied to the testing device 10 which is configured to replicate a network configuration of the cellular network in the field based on the received network profile. If a number of cells included in the field test log file LogF of the device under test 2 exceeds a predefined number of cells which can be supported by the testing device 10, the network configuration is automatically restricted to most relevant cells. These relevant cells comprise in particular cells where an irregular behavior of the device under test 2 has been observed during the field test. Accordingly, if the testing device 10 is adapted to support a maximum number of cells NMAX, the number of cells included in the field test log file LogF can be restricted to a number n smaller or equal to this maximum number of supported cells (n≤NMAX). For instance, the testing device 10 formed by a network simulator may only have the capabilities to simulate a limited number of cells. In this case, the computer system 4 running a field to lab software tool performing the method according to the present invention as illustrated in FIG. 1 allows for extracting only a limited number of cells, for instance four cells or two cells as well as their configuration. The recorded cell configuration such as operator data, country codes or information of neighboring cells can be used to simulate protocol procedures other than those seen in the field. The network simulator 10 is configured to replicate a field configuration. For instance, it can be simulated whether a software update for the device under test 2 would fix a problem observed in a situation of the field test without performing an additional field test.

The invention provides according to a further aspect a field to lab software tool which can be executed by the computer system 4 as illustrated in FIG. 3. The field to lab software tool can be used to generate a network profile which may be applied to a testing device 10 such as a network simulator. The field to lab software tool is adapted to generate a network profile used for the testing of a device under test 2 wherein the field to lab software tool performs the steps of the method according to the first aspect of the present invention as illustrated in FIG. 1. An exemplary implementation of the field to lab software tool which can be run on the computer system 4 of the system 1 as illustrated in FIG. 3, is shown in FIGS. 4 to 7.

Figure 4:
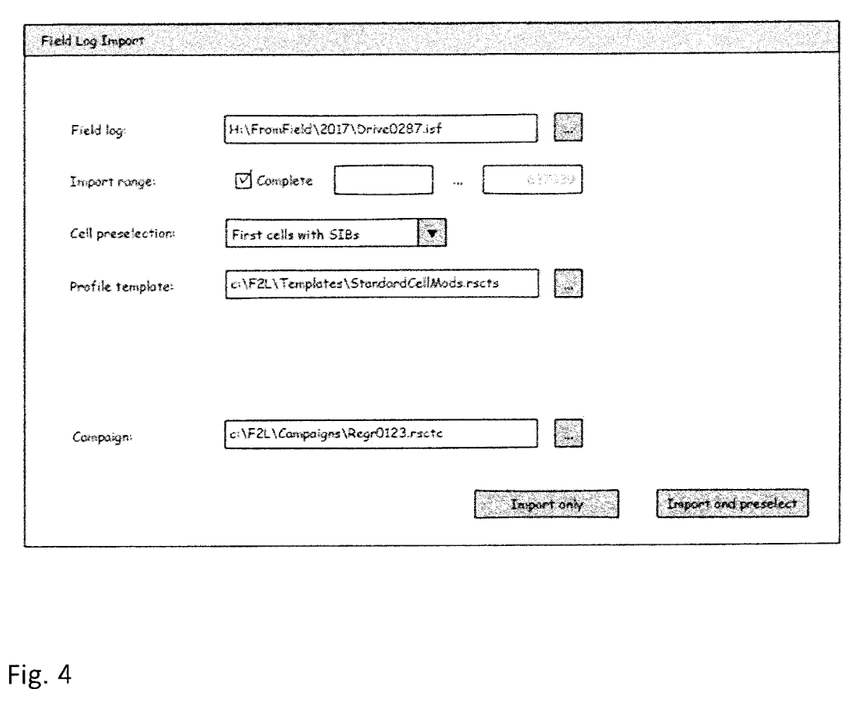

FIG. 4 shows an example of a field log mask of the in-field to lab software tool. As can be seen, the mask shown in FIG. 4 comprises several data fields including a field for the field test log file LogF, a field for an input range as well as a field for a cell preselection which may be performed by a user performing the test procedure. Further, a profile template may be displayed to the user. The displayed field block log as shown in FIG. 4 can be displayed in a possible implementation on a display unit of the user interface 9 of the computer system 4 illustrated in FIG. 3.

FIG. 5 illustrates a specific example for a field test log file LogF which may be generated by the device under test 2 during an in-field test.

Figure 6:
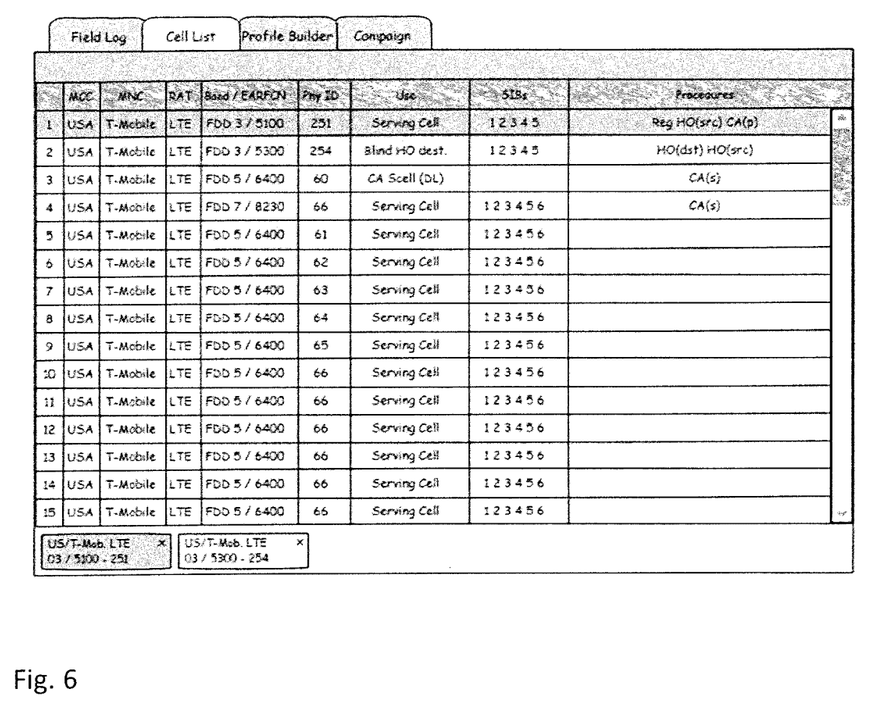

FIG. 6 illustrates an example of a cell list which can be in a possible implementation be presented to a user by means of an interface of the computer system 4. The cell list comprises different kinds of information, in particular country codes, operator data or frequency information. Further, the cell list includes SIB data concerning system information block broadcast messages.

Figure 7:
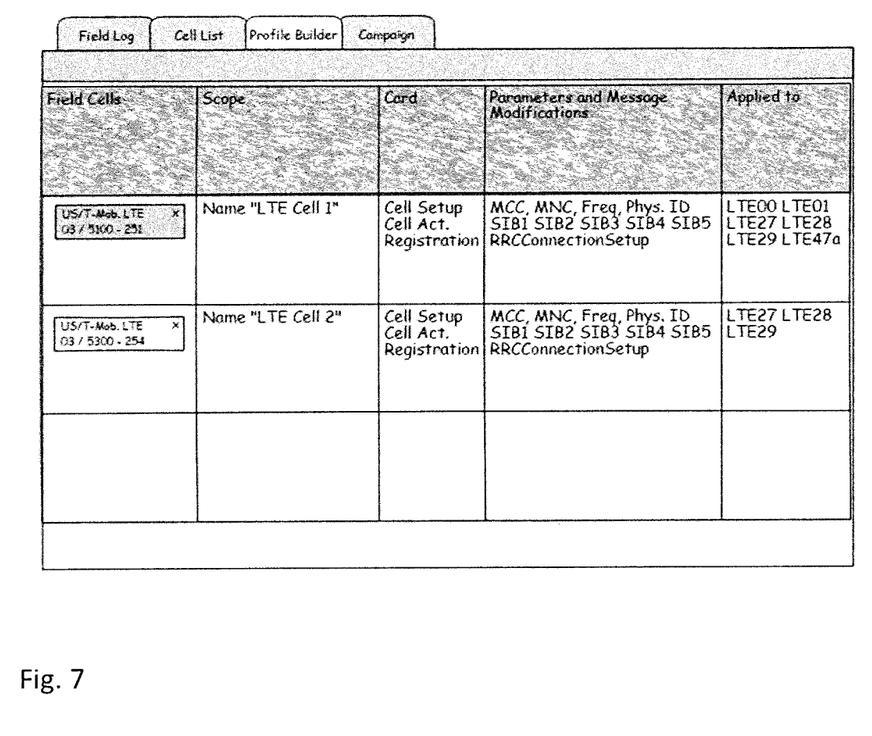

FIG. 7 illustrates generated network profiles which can be applied to the testing device 10 of the system 1.

In the illustrated embodiment of FIG. 3, the system 1 comprises a computer system 4 forming a processing device and a testing device 10 which receives a network profile such as illustrated in FIG. 7 to perform network simulations. In a possible embodiment, the processing unit 4 used for generating the network profile can be integrated as a pre-processing unit into the testing device 10. The method and system 1 according to the present invention can reduce significantly expensive and time-consuming drive tests or in-field tests, in particular for LTE and LTE Advanced modules. The field to lab software tool is a useful tool to solve challenges concerning protocol and application layers in diverse mobile operator networks where different network configurations can cause issues and problems, in particular during handovers and roaming Real network drive tests or in-field tests can be performed in different countries. The method and system 1 according to the present invention allows manufacturers of a device under test 2 to use virtual drive tests or in-field tests during the development of LTE or LTE Advanced modules which can ultimately be used in smartphones or user equipment as well as machine-to-machine applications or automotive applications. The network-specific field tests can include analysis of call drops or cell handover problems and/or roaming issues which are especially critical when crossing a country and thus cell borders. It is possible to eliminate crucial errors in protocol stack implementations before continuing integration and performing further drive tests. By importing relevant network operator parameters extracted from real drive test log files the system 1 according to the present invention provides additional tools to significantly reduce expensive and time-consuming field tests. The method and system 1 allow to test one or more devices under test 2 or cellular modules in various simulation scenarios under controlled reproducible conditions in a test laboratory. More relevant field network parameters can be used to recreate collected drive test data in the system 1. Accelerating network drive test processes as achieved by the system 1 according to the present invention results in a faster time to market of the devices under test 2. The method according to the present invention is adapted to extract particular downlink messages from the log file which are especially helpful to later simulate the network behavior. Especially, layer 3 uplink messages and downlink messages are relevant for the later simulation of the network behavior. The protocol messages extracted from the recorded field test log file LogF can comprise protocol messages of different protocol layers of a protocol stack. The method according to the present invention allows to extract communication information concerning a specific cell or base station of the mobile communication network and/or a specific protocol from a protocol stack layer to provide a network profile applied to the testing device 10. The testing device 10 can comprise a controller adapted to implement a mutual signaling including signaling portions with the device under test 2. The controller can generate cards for display by means of a display unit of the testing device 10 wherein the generated cards can correspond to a given signaling portion.

REFERENCE SIGNS

1 system
2 device under test
3 log recorder
4 computer system
5 input interface
6 processor
7 output interface
8 local memory
9 user interface
10 testing device

The invention claimed is:

1. A method for providing a network profile used for testing of a device under test, the method comprising the steps of:
reading at least one field test log file recorded during a field test of said device under test,
wherein the field test log file comprises network protocol messages and/or physical layer measurement data; and
extracting one or more protocol messages and/or payload data from the recorded field test log file including information concerning associated cells of a cellular network to generate automatically the network profile,
wherein the generated network profile is applied to a testing device which replicates a network configuration of the cellular network in the field.

2. The method according to claim 1 wherein if a number of cells included in the field test log file of said device under test exceeds a number of cells supported by the testing device, the network configuration is automatically restricted to relevant cells.

3. The method according to claim 2 wherein the relevant cells comprise cells where an irregular behavior, in particular a failure, concerning the device under test has been observed during the field test.

4. The method according to claim 1 wherein the field test log file recorded during a field test of said device under test comprises a file format specific to a type of the device under test.

5. The method according to claim 1 wherein the protocol messages extracted from the recorded field test log file comprise downlink protocol messages transmitted by a base station to the device under test located in a cell of the cellular network during the field test.

6. The method according to claim 1 wherein the protocol messages extracted from the recorded field test log file comprise uplink protocol messages transmitted by the device under test located in a cell of the cellular network to a base station of said cell during the field test.

7. The method according to claim 1 wherein the protocol messages extracted from the recorded field test log file comprise broadcast messages, in particular system information block broadcast messages.

8. The method according to claim 1 wherein the information concerning a cell associated with extracted protocol messages comprises:
operator data,
a country code,
a cell identifier of the cell,
a cell configuration,
a system information block, SIB, data,
neighbor cell information data and
a cell frequency and/or a cell frequency band.

9. The method according to claim 1 wherein the physical layer measurement data of the recorded field test log file comprise radio signal parameters including signal strength, signal quality and/or signal fading.

10. The method according to claim 1 wherein a message flow of the protocol messages extracted from the recorded field test log file is analyzed to identify protocol procedures executed during the field test using graph-based algorithms and/or machine learning.

11. The method according to claim 1 wherein network protocol messages and/or physical layer measurement data forming relevant information elements of the field test log file are presented to a user by means of a user interface and/or applied to a filter to select and/or filter the relevant information elements.

12. The method according to claim 11 wherein the selected and/or filtered relevant information elements are grouped automatically according to the type of the network and the associated cells of the network.

13. A non-transitory computer readable medium for generating a network profile used for testing of a device under test,
wherein the network profile is generated by performing the steps of:
reading at least one field test log file recorded during a field test of the device under test, wherein the field test log file comprises network protocol messages and/or physical layer measurement data; and
extracting one or more protocol messages and/or payload data from the recorded field test log file including information concerning associated cells of a cellular network to generate automatically the network profile.

14. A system for mobile radio testing of a device under test comprising:
a processing unit adapted to read at least one field test log file recorded during a field test of said device under test from a memory,
wherein the field test log file comprises network protocol messages and/or physical layer measurement data and adapted to extract one or more protocol messages and/or payload data from the recorded field test log file including information concerning associated cells of a cellular network to generate automatically the network profile,
wherein the generated network profile is applied to a testing device of the system which is configured to replicate a network configuration of the cellular network in the field.

* * * * *